United States Patent [19]
Cotton et al.

[11] Patent Number: 5,823,115
[45] Date of Patent: *Oct. 20, 1998

[54] GUIDING OF A PIPE TRAVELLING DEVICE

[75] Inventors: Michael Cotton, Castleford; Kevin Michael Horan, Rodley, both of Great Britain

[73] Assignee: British Gas plc, Reading, England

[*] Notice: This patent issued on a continued prosecution application filed under 37 CFR 1.53(d), and is subject to the twenty year patent term provisions of 35 U.S.C. 154(a)(2).

[21] Appl. No.: 523,250

[22] Filed: Sep. 5, 1995

[30] Foreign Application Priority Data

Sep. 9, 1994 [GB] United Kingdom .................... 9418196
May 3, 1995 [GB] United Kingdom .................... 9508958

[51] Int. Cl.$^6$ ...................................................... B61B 13/10
[52] U.S. Cl. ........................................................ 104/138.2
[58] Field of Search ............................... 104/138.1, 138.2, 104/165, 112

[56] References Cited

U.S. PATENT DOCUMENTS

| | | | |
|---|---|---|---|
| 3,603,264 | 9/1971 | Von Arx | 104/138.2 |
| 3,794,340 | 2/1974 | Tartabini et al. | 104/138.2 |
| 4,212,248 | 7/1980 | Maybury | 104/138.2 |
| 4,244,296 | 1/1981 | Vertut | 104/138.2 |
| 5,025,670 | 6/1991 | McNulty | 73/865.8 |
| 5,203,646 | 4/1993 | Landsberger et al. | 104/138.2 |

FOREIGN PATENT DOCUMENTS

| | | |
|---|---|---|
| 0426871 | 5/1991 | European Pat. Off. . |
| 2247504 | 3/1992 | United Kingdom . |

*Primary Examiner*—S. Joseph Morano
*Attorney, Agent, or Firm*—William H. Holt; William R. Hinds

[57] ABSTRACT

A method for guiding a device in a required direction along the interior of a pipe, the method comprising removably mounting the device on a curved guide, lowering the device and the guide through a hole bored in the wall of the pipe to gain access to the interior of the pipe with the guide arranged to curve in the required direction in which the device is to move along the pipe and moving the device off the guide in the required direction.

5 Claims, 6 Drawing Sheets

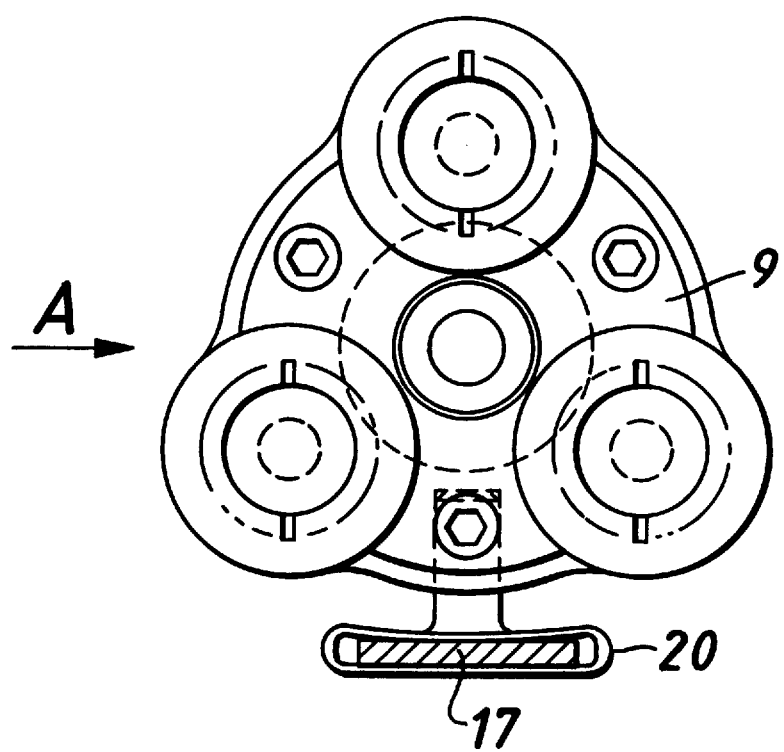

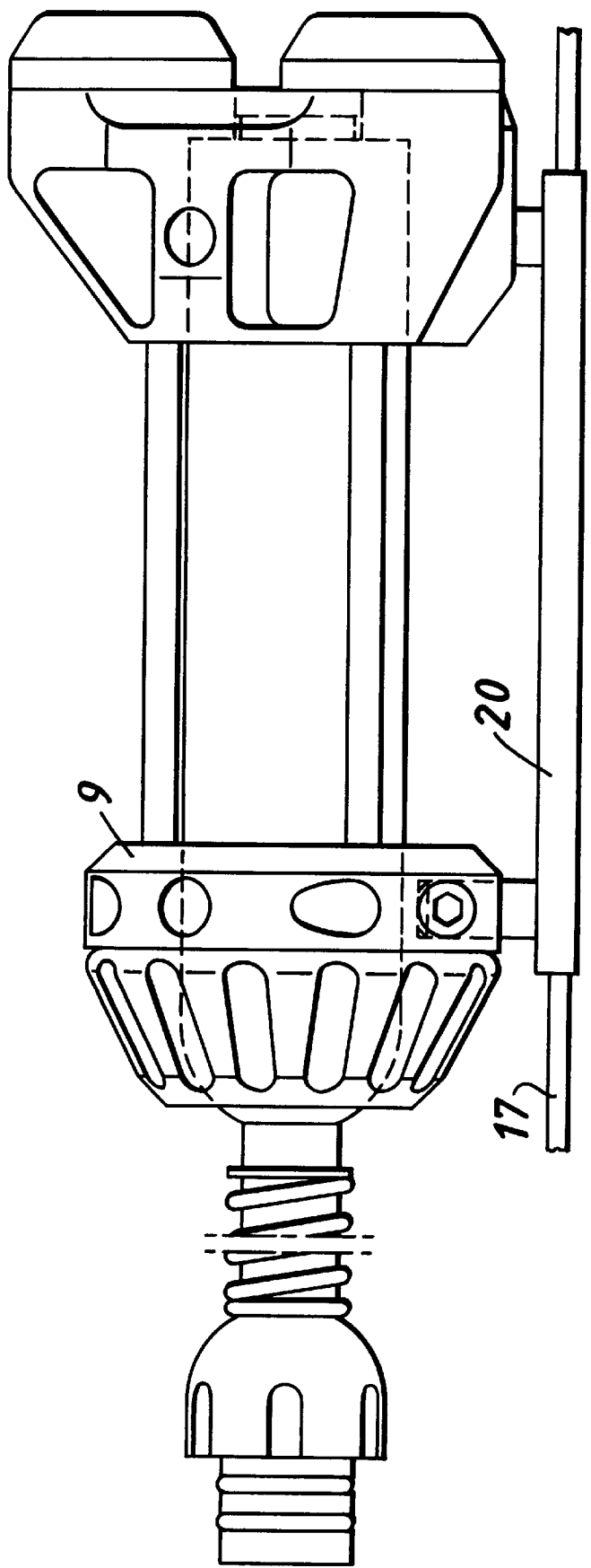

GUIDING OF A PIPE TRAVELLING DEVICE

The present invention relates to guiding a device in a required direction along the interior of a pipe.

It is known to guide devices along the interior of pipe for such purposes as inspecting the interior wall of the pipe (in which case the device is a closed circuit television camera) or spraying the wall with a sealant (in which case the device is a spray head).

The devices are usually introduced into the pipe via a hole bored in the wall of the pipe. It is, of course, important to ensure that upon introduction into the pipe the device is guided in the correct direction and this can be very much a hit or miss affair.

In known techniques of seeking to ensure that the device travels in the correct direction, entry pipes or tubes are provided arranged at an angle to the vertical to carry the device into the pipe via the bored hole to ensure the device travels in the selected direction. However, the disadvantage of these techniques is that the entry tubes reduce the overall size of the device which can be introduced into the pipe as the device is introduced at an angle to the hole in the pipe wall.

It is therefore an object of the present invention to overcome this disadvantage.

According to one aspect of the present invention there is provided a method for guiding a device in a required direction along the interior of a pipe, the method comprising removably mounting the device on a curved guide, lowering the device and the guide through a hole bored in the wall of the pipe to gain access to the interior of the pipe with the guide arranged to curve in the required direction in which the device is to move along the pipe and moving the device off the guide in the required direction.

According to another aspect of the present invention there is provided apparatus for guiding a device in a required direction along the interior of a pipe, the apparatus comprising a curved guide upon which, in use, the device is mounted and means for removably mounting the device on the guide, the arrangement being that, in use, the device and guide are lowered through a hole bored in the wall of the pipe to gain access to the interior of the pipe with the guide arranged to curve in the required direction in which the device is to move along the pipe and the device is moved off the guide in the required direction.

Preferably the guide is a spring which may be a bag-tube spring.

Suitably the device is removably mounted on the guide by means of a skid.

Because the device can be introduced substantially vertically to the axis of the pipe, the full bore of the hole in the pipe wall can be used.

An embodiment of the invention will now be particularly described with reference to the accompanying drawings in which:

FIG. 5 shows a front view of a typical closed circuit television camera incorporating a skid, and FIG. 6 is a view in the direction of A in FIG. 5.

Figure 1:
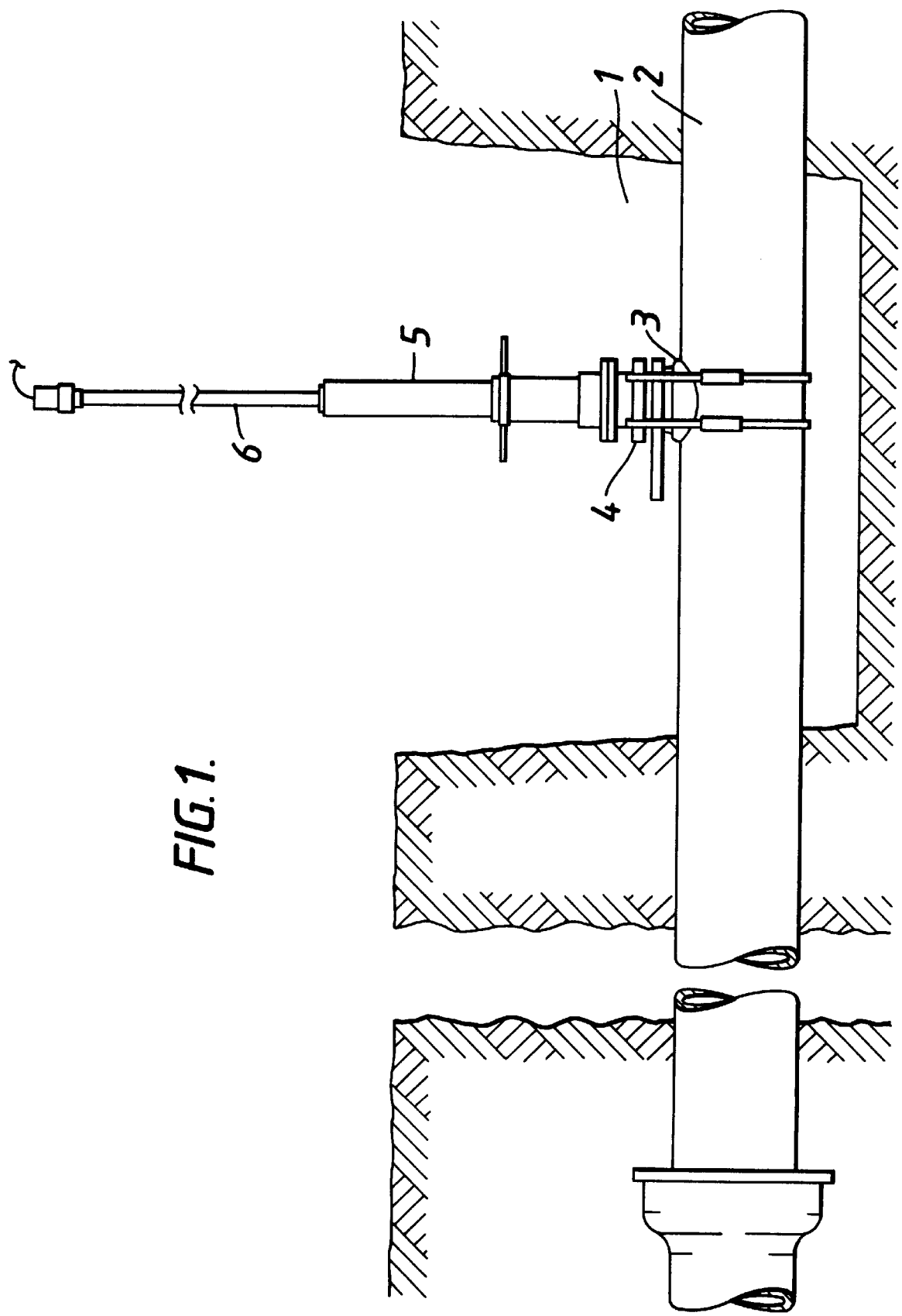
FIG. 1 shows an insertion tube in position on a pipe such as a main carrying gas under pressure before the introduction of a device such as an inspection camera, FIGS. 2 to 4 comprise longitudinal sections through the insertion tube and the main showing a sequence of operations for guiding the camera along the main.

Referring to the drawings, in the situation shown in FIG. 1, an excavation 1 has been dug so as to reveal a portion of a live gas main 2.

Figure 2:
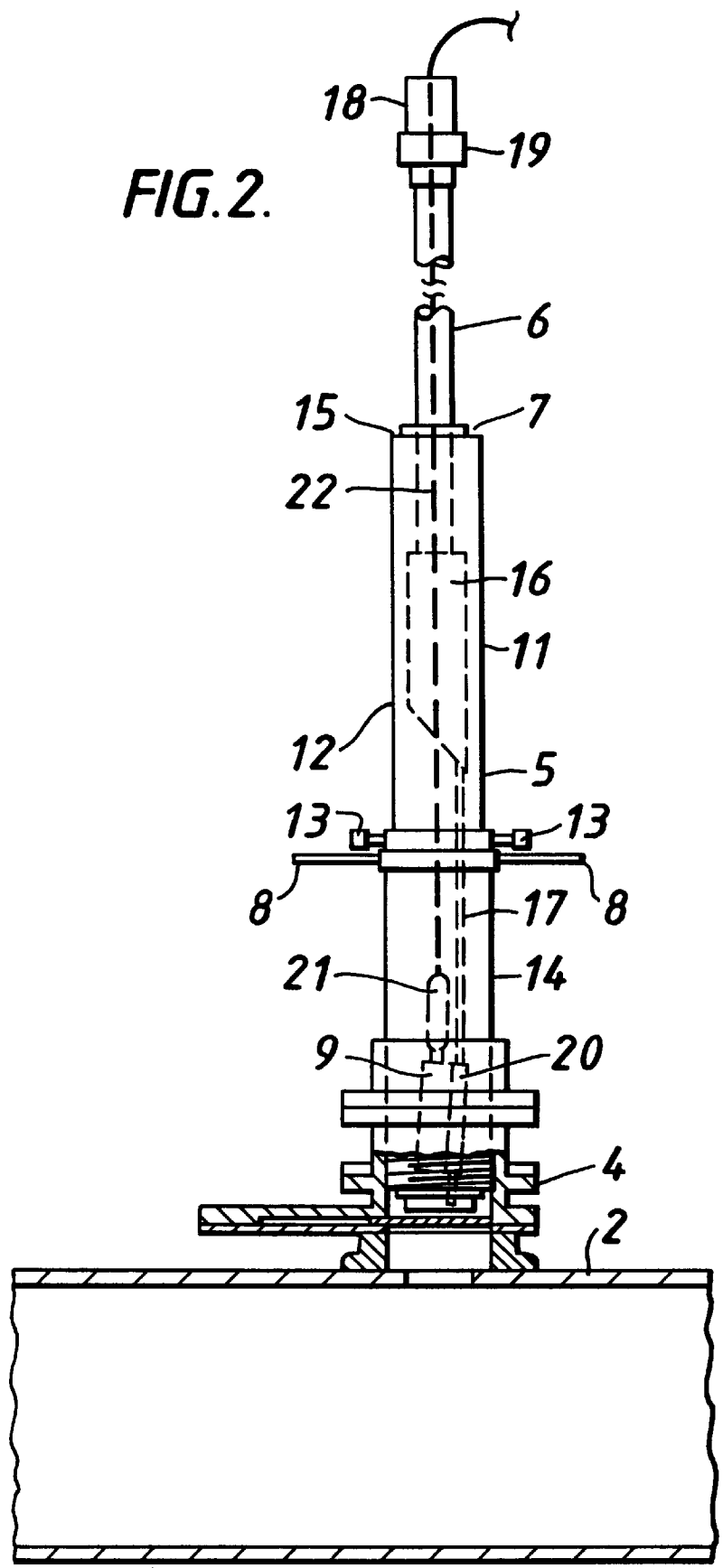
Figure 3:
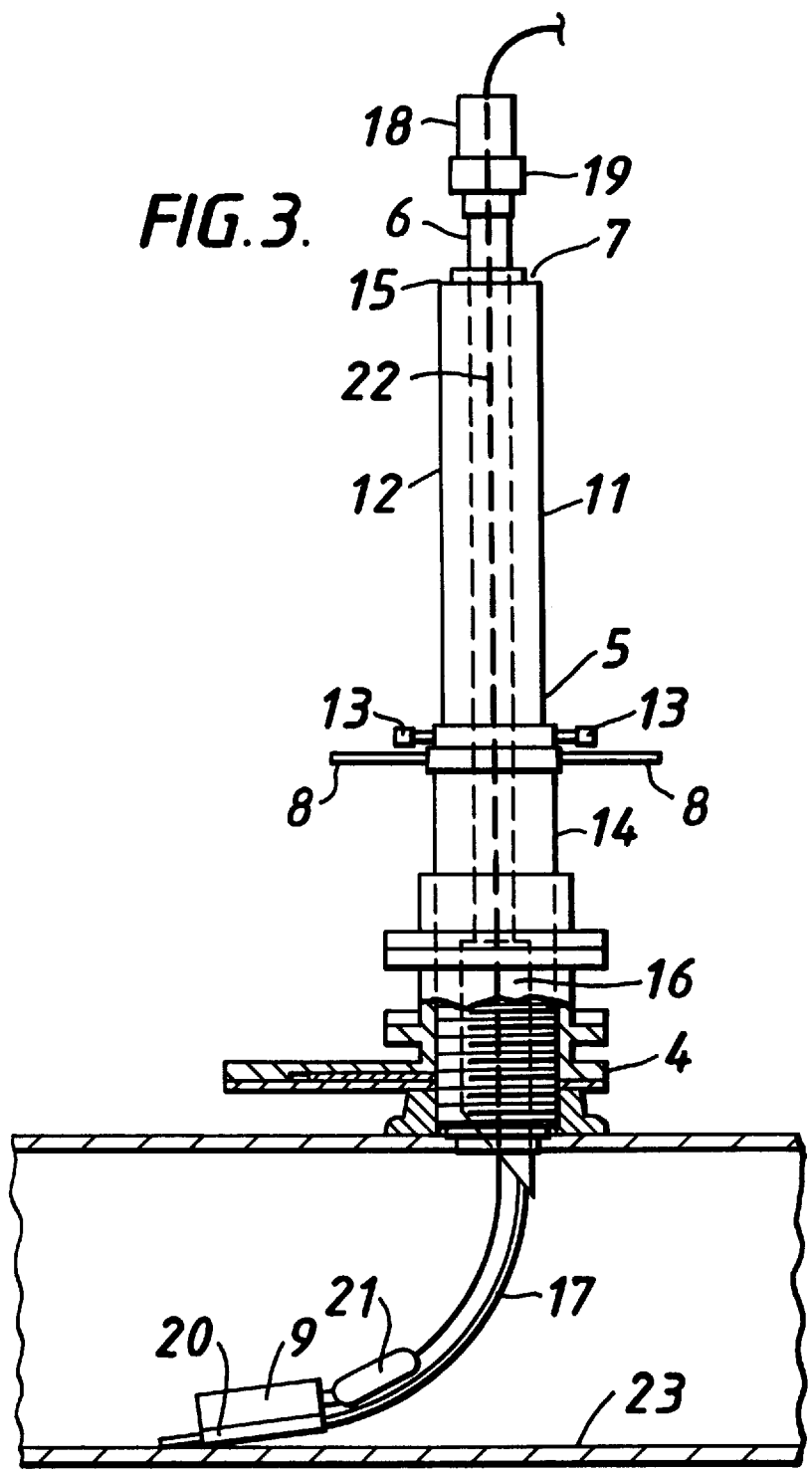
Figure 4:
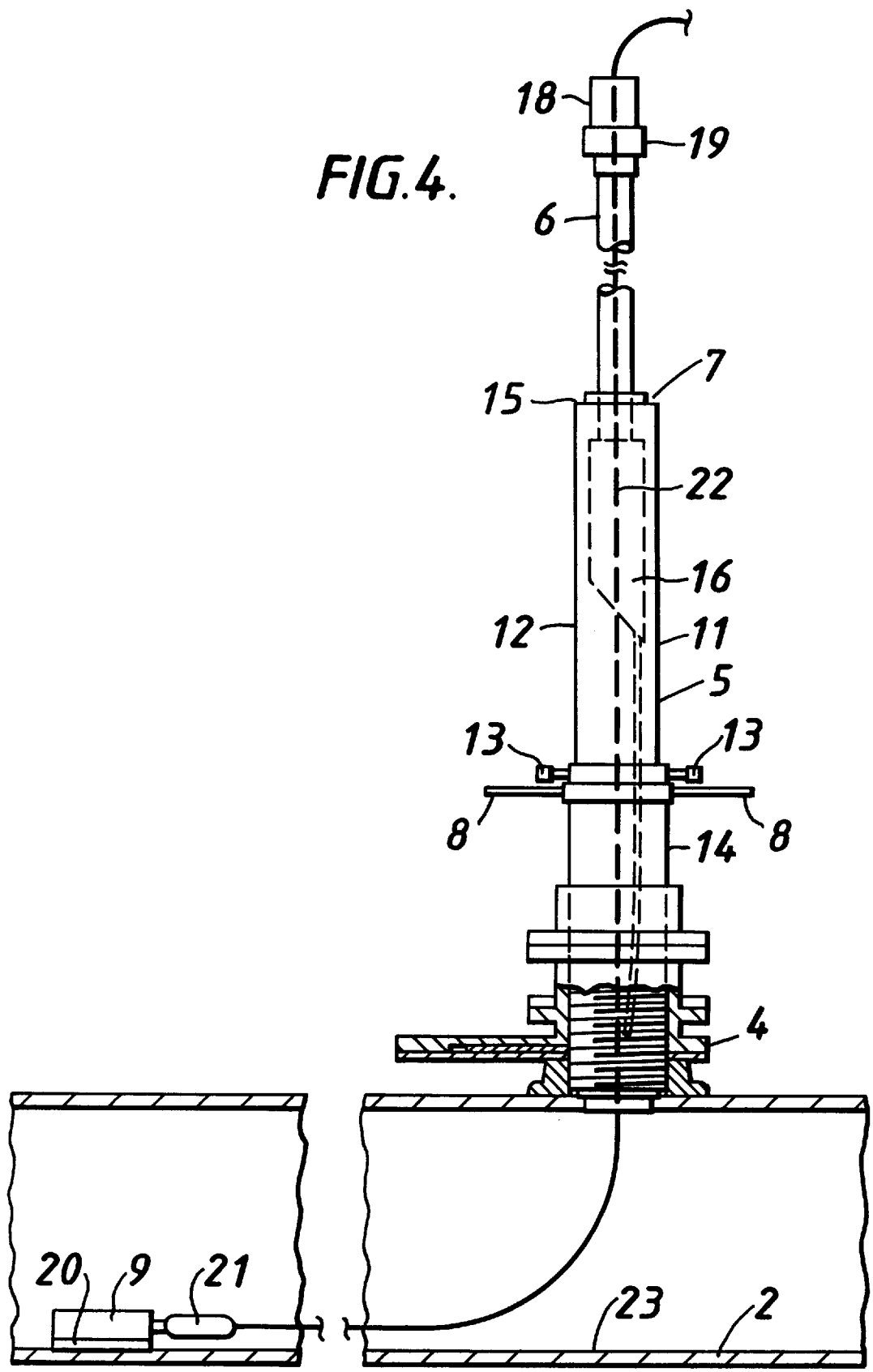

In FIGS. 2 to 4 a hole 3 has been drilled in the wall of the main 2.

In the known technique used here to drill the hole an Iris plate valve 4 manufactured by ALH Systems Ltd is mounted on the main 2. An underpressure drill (not shown) is fitted to the plate valve 4 and operated to cut the hole 3 through the main (FIGS. 1 and 2).

A conventional construction and design insertion tube 5 is then fitted to the plate valve 4 in place of the underpressure drill in the well known manner.

The insertion tube 5 is bolted to the uppermost surface of the plate valve 4 in the well known manner and a known-type cable insertion tube 6 mounted in the insertion tube 5 is arranged so that a direction indicator on a pointer clamp plate 7 points in the direction in which a device 9 to be inserted into the main 2 is required to go. By unbolting the insertion tube 5 from the plate valve 4 by means of the handles 8 and rotating it through 180° and rebolting it to the plate valve 4, the device 9 can be pushed into the main in two opposite directions, thereby enabling both directions to be inspected from one drilling.

The insertion tube 5 has a main tubular outer body 11 having a uppermost portion 12, and detachably removable allen screws 13 and a lowermost flanged portion 14 for bolting to the plate valve 4. The portion 12 is externally threaded while the flange portion 14 is correspondingly internally threaded to receive the threaded portion of the uppermost portion 12. This arrangement enables the portions 12 and 14 to be wound into or away from the flanged portion 14. The cable insertion tube 6 extends through the portion 12 and forms a seal with the upper end 15 of the portion 12. The cable insertion tube 6 has a lowermost shoe piece 16 to the inside wall of which is secured one end of a flat steel "bag" spring 17. The term "bag" is used since in normal use of the insertion tubes 5 and 6 the spring 17 is used to insert inflatable flow stopper bags into the gas pipe temporarily to stop the flow therein, the inflatable bag being connected to the other lowermost end of the spring 17. As shown in the drawings the spring 17 is curved as conventional to ensure that the device 9 to be inserted into the main travels in the correct direction.

The cable insertion tube 6 also has a rubber gland 18 mounted in a socket 19 at its uppermost end for purposes to be described.

In the case of this invention the device to be inserted into the main 2 is a conventional closed circuit pipe wall inspection television camera as seen at 9 in FIGS. 5 and 6. The camera 9 has bolted thereto a skid 20 to receive the spring 17 as shown in the drawings.

The camera 9 is releasably attached at one end via a connector 21 to a flexible camera cable 22. The other end of the cable 22 (not shown) is, in use, attached to a data interface port, television monitor, video recorder and printer.

Referring to FIGS. 2 to 4, the sequence of operations for guiding the camera 9 along the main 2 is as follows. With the uppermost portion 12 of the insertion tube 5 temporarily removed from the lowermost portion 14 and clear thereof, the end of the cable 22 is pushed through the rubber gland 18 which has a central aperture for the purpose and into the tube 6 then through the shoe 16 until it reaches the spring 17.

The camera skid 20 is then fitted onto the bag spring 17 and the cable 22 is connected to the connector 21. The aperture in the gland 18 is so dimensioned that the gland 18 forms a seal round the cable 22. It will be appreciated that at this stage the closure plate in the plate valve 4 is closed to prevent the escape of gas from the main. The uppermost portion 12 of the insertion tube 5 is then reconnected to the lowermost portion 14.

In the next stage of the process (FIG. 3) the plate in the plate valve 4 is opened and the portion 12 is wound down into the flanged portion 4 through the plate valve 14 and into the pipe wall 3. The camera 9 is pushed into the interior of the main 2 by pushing the cable insertion tube 6 downwardly through the main insertion tube 5 until the spring 17 engages the internal wall 23 of the main 2 as shown in FIG. 3.

Next the camera cable 22 is fed through the gland 18 so that the camera 9 is caused to detach from the bag spring 17 and move along the main 2 as far as possible relaying pictures back to the monitor (FIG. 4).

Because the bag spring 17 curves at the end which is introduced into the main 2, then providing that the curve is pointing in the correct direction, the camera 9 will always be guided in the required direction along the interior of the main 2.

To remove the camera 9 from the main 2, the cable 22 is pulled back through the gland 18 until the camera 9 has been withdrawn through the open plate valve 4 which is then closed and into the portion 14.

The insertion tube 6 is withdrawn upwards inside insertion tube 5 and is then removed from the plate valve 4. The portions 12 and 14 are wound back out from the main 2 until a collar (not shown) at the lowermost end of the portion 14 is clear of the plate valve 4. Using any well known technique the hole 3 in the wall of the main 2 can be plugged, e.g. by means of a non-tap plug before the plate valve 4 is removed.

While the device described is a television camera, the device could be any other piece of equipment used inside pipes and mains such as a spray device for spraying a sealant on the internal wall of the main.

We claim:

1. A method for guiding a device in a required direction along the interior of a pipe, the method comprising removably mounting the device on a curved guide, lowering the device and the guide through a hole bored in the wall of the pipe to gain access to the interior of the pipe with the guide arranged to curve in the required direction in which the device is to move along the pipe, and moving the device off the guide in the required direction along the interior or the pipe, the steps of removably mounting, lowering, and moving comprise removably attaching a bag spring to the device and curving the bag spring in the required direction so as to guide the device in the required direction when lowered into the pipe, and moving the device off the bag spring in the required direction.

2. A method as claimed in claim 1 in which the spring is a bag tube spring.

3. A method as claimed in claim 1 in which the device is removably mounted on the guide by means of a skid.

4. Apparatus for guiding a device in a required direction along the interior of a pipe, the apparatus comprising a curved guide upon which, in use, the device is mounted, and means for removably mounting the device on the guide, the arrangement being such that, in use, the device and mounted guide can be lowered through a hole bored in the wall of a pipe to gain access to the interior of the pipe with the guide arranged to curve in the required direction in which the mounted device is to move along the pipe and the device can be moved off the guide in the required direction, in which said guide is a spring and said spring is a bag tube spring.

5. Apparatus as claimed in claim 4 in which the means is a skid for removably mounting the device on the guide.

* * * * *